(12) United States Patent
Iwamoto et al.

(10) Patent No.: US 6,371,561 B1
(45) Date of Patent: Apr. 16, 2002

(54) FRAME STRUCTURE FOR A SEATBACK OF A SEAT

(75) Inventors: Yoshiyuki Iwamoto; Shuji Kumano; Kazuhiro Matsuhashi, all of Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/590,134

(22) Filed: Jun. 9, 2000

(30) Foreign Application Priority Data

Jun. 11, 1999 (JP) .......................................... 11-165047

(51) Int. Cl.[7] ................................................. A47C 7/02
(52) U.S. Cl. ................................................. 297/452.18
(58) Field of Search ........................... 297/284.1, 284.4, 297/452.18

(56) References Cited

U.S. PATENT DOCUMENTS 5,101,811 A * 4/1992 Brunswick
5,509,716 A * 4/1996 Kolena et al.
5,697,670 A * 12/1997 Husted et al.
6,186,594 B1 * 2/2001 Valiquette et al.

FOREIGN PATENT DOCUMENTS

JP 10-85079 4/1998

* cited by examiner

Primary Examiner—Milton Nelson, Jr.
(74) Attorney, Agent, or Firm—Nixon Peabody LLP; Donald R. Studebaker

(57) ABSTRACT

A seatback frame structure (F) for a seatback (2) of a seat (S) comprises a generally rectangular seatback frame (4) and a lower or primary wire frame (9) which has base frame sections (9a) extending from opposite vertical side frame sections (4a) of the rectangular seatback frame (4) at a height of lumbar vertebras, respectively, an upward extending support frame section (91) which extends upward from the base frame sections (9a) and comprises opposite vertical side frame sections (91b) extending from the base sections (4a), respectively, and a horizontal frame section (91a) extending between the opposite vertical side frame sections (91b) at a height of shoulder blades, and an upper or subsidiary wire frame (8) extending between the opposite vertical side frame sections (4a) behind the upward extending support frame section (91). The upward extending support frame section (91) at its upper part is bent backward so as to extend along the backbone of a person P sitting on the seat S.

20 Claims, 15 Drawing Sheets

FUG. 12

FRAME STRUCTURE FOR A SEATBACK OF A SEAT

BACKGROUND OF THE INVENTION

1. Field of the Invention

The present invention relates to a seatback frame structure that is installed in a his seatback of a seat.

2. Description of the Related Art

There have been proposed a variety of frame arrangements that are installed in the inside of a seatback of a seat. Such a seatback frame is provided in various configurations and structures meeting necessary structural stiffness properties and satisfying a demand of a person who sits on the seat. For example, some of such seatbacks are equipped with a plurality of wire springs stretched across a generally rectangular seatback frame which defines an external border of the seatback frame arrangement in order to provide the seatback with required stiffness, and some of such seatbacks are equipped with a wire net or a wire net-like plate that is supported by a plurality of springs mounted on a frame of the seatback frame arrangement so as to provide the seatback with required stiffness and elasticity. In recent years, there is a strong demand for various properties and qualities such as adaptability to automatic assembling and a light-weight seat, and a large space within a seatback for installing a side air bag unit therein if the seat is used as a vehicle seat. However, since the above mentioned seatback is typically too complicate in structure to satisfy the demand pointed above.

A seatback that seems to satisfy the above demand has been proposed in, for example, Japanese Unexamined Patent Publication No. 10-85079. The seatback disclosed in the publication has such a simple seatback frame structure that comprises transverse wires stretched across a seatback frame and vertical wires extending from the basal part of the seatback frame over the transverse wires so as to provide the seatback with stiffness. In this seatback frame structure, because the transverse wires, which elastically support the back of a person who sits on the seat, extend directly upward from the basal part of the seatback frame, all of the wires deform or deflect backward with respect to the bottom line of the seatback frame as a supporting point when the back of the person sitting on the seat leans on the seatback, so that the seatback can not provide lumbar support which refers to support of the back of the person in a fashion in conformity with the S-shaped backbone of the person. The seatback that is incapable of providing the lumbar support makes a person sitting on the seat hard to hold a sitting posture for a long period of time, which results in causing the person to feel pain.

SUMMARY OF THE INVENTION

It is an object of the present invention to provide a seatback frame structure for a seatback of a seat which has high adaptability to automatic assembling and a light-weight seat and provides a large space for a side air bag unit to be installed within a seatback if used for a vehicle seat.

It is another object of the present invention to provide a seatback frame structure for a seatback which provides lumbar support or support of the back of a person who sits on the seat in conformity with a shape of his or her backbone while is simple in structure.

According to one aspect of the present invention a seatback frame structure comprises a generally rectangular seatback frame which has opposite side frame sections extending vertically along opposite sides of a seatback, and a wire frame which has a pair of base frame sections extending substantially horizontally between and secured to lower parts of the opposite side frame sections, respectively, and an upward extending support frame section extending upward from the base frame sections and elastically deflectable backward with respect to the base frame sections. The wire frame may further comprise a downward extending support frame section disposed between each of the base frame sections and the upward extending support frame section and extending downward from the base frame section and elastically deflectable backward with respect to the base frame section.

The seatback frame structure thus configured causes backward elastic deflection at the upward extending support frame section and only a slight backward elastic deformation at the base sections when a person sits on the seat with his or her back leaning on the seatback with an effect of providing the person with a feeling of backward displacement at the upper part of the wire frame and firm lumbar support due to stiffness at the middle part of the wire frame. Accordingly, the seatback equipped with the seatback frame structure therein realizes support of the back of a person sitting on the seat in a fashion in conformity with the backbone of the person. The downward extending support frame section which is deflectable backward provides firm support of the back of a person siting on the seat nearly to a position corresponding to a coccyx of the person without giving the person a heterogeneous feeling and prevents the coccyx and buttocks of the person from changing backward in position on the seat, which gradually leads to a bad posture. Further, the wire frame increases stiffness of the seatback gradually in order of the upper part, the lower part and the middle part, so as to provide comfortable support of the back of the person sitting on the seat while the seatback frame structure is simple and at low costs.

According to another aspect of the present invention, a seatback frame structure comprises a generally rectangular seatback frame which has opposite side frame sections extending vertically along opposite sides of the seatback, and a wire frame which has a pair of base frame sections extending substantially horizontally between and secured to lower parts of the opposite side frame sections, respectively, at a height corresponding to a lumbar vertebra of a person who sits on the seat and an upward extending support frame section extending upward from the base frame sections to a height corresponding to shoulder blades of the person and elastically deflectable backward with respect to the base frame sections. The wire frame may further comprise a downward extending support frame section disposed between each of the base frame sections and the upward extending support frame section so as to extend downward to the height corresponding to the lumbar vertebras from the base frame sections and elastically deflectable backward with respect to the base frame sections.

The seatback frame structure thus configured provides more comfortable lumbar support in conformity with a body shape of a person siting on the seat due to the configuration of the wire frame that comprises the base frame sections extending transversely at a height of a lumbar position of the person and the upward extending support frame section extending to a position of shoulder blades of the person. Further, due to the downward extending support frame sections extending to the coccyx position of the person between the base frame sections and the upward extending support frame section, the seatback frame structure provides support of the back of the person along the backbone, which realizes back support of a person sitting on the seat in conformity with a body shape of the person. The horizontally extending base frame sections provides the wire frame at its basal part with high stiffness, so that the seatback is possible to have increased support rigidity at its middle part.

In these embodiments, the seatback frame structure may further comprise a deflection restricting member operative to restrict the wire frame to a specified backward deflection. Specifically, the deflection restricting member is disposed behind the upward extending support frame section of the wire frame and comprises a subsidiary wire frame extending between and secured to upper parts of the opposite side frame sections, respectively, so as to cross over the upward extending support frame section of the wire frame. Further, the deflection restricting member comprises an elastic member operative to suspend the upward extending support frame section from the generally rectangular seatback frame. The deflection restricting member limits the largest elastic deflection of the upward extending support frame section to a specified amount, so as to render the seatback to support the back of a person when the person sits deeply on the seat. The utilization of the subsidiary wire frame for the deflection restricting member ensures the seatback frame structure to be made simple in structure and to provide stable support of the back of the person sitting on the seat. The utilization of an elastic member for the deflection restricting member makes it possible to change backward deflection of the wire frame desirably by replacing the elastic member with other elastic members having different elasticity according to demands.

The seatback frame structure may further comprise elasticity exerting member operative to provide the wire frame with forward elasticity and to allow the upward extending support frame section to deflect only backward. The elasticity exerting member fixedly couples the wire frame at the upward extending support frame section to the generally rectangular seatback frame. The upward extending support frame section can be pre-urged forward by the elasticity exerting member, so that the seatback is provided with ensured support rigidity without increasing stiffness of the upward extending support frame section.

The wire frame may be configured so as to form a swelling between the upward extending support frame section and the downward extending support section, the swelling being directed forward at a height corresponding to a lumbar vertebra of a person who sits on the seat The swelling is directed forward from the front of the seatback and, in consequence, cooperates with the base frame sections to provide firm lumbar support even when the upward extending and the downward extending support frame section are deflected backward by the weight of the person sitting on the set.

BRIEF DESCRIPTION OF THE DRAWINGS

The above and other objects and features of the present invention will be clearly understood from the following detailed description with regard to the preferred embodiments thereof when reading in conjunction with the accompanying drawings, wherein the same reference numerals have been used to denote same or similar parts throughout the drawings, and in which.

DETAILED DESCRIPTION OF THE PREFERRED EMBODIMENTS

Figure 1:
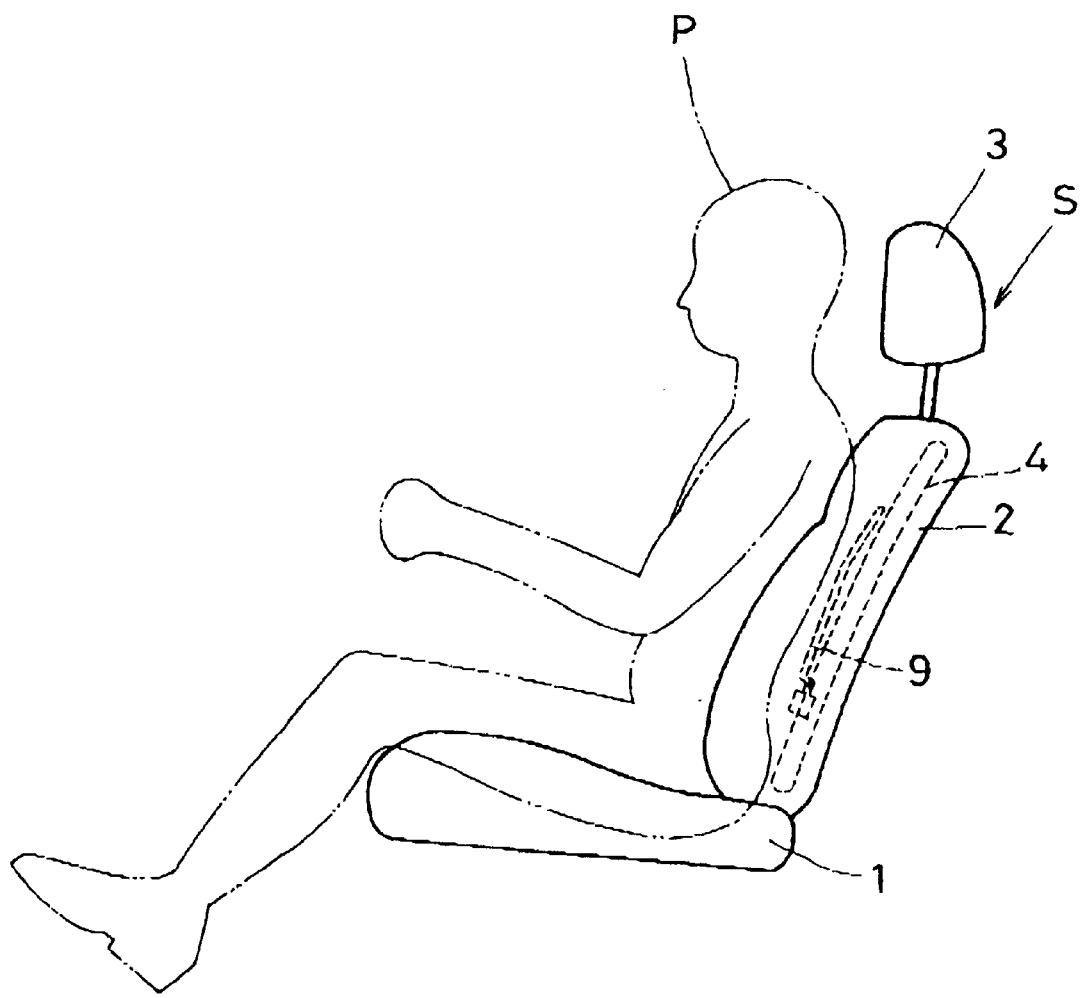
FIG. 1 is a side view of a vehicle seat having a seatback which is equipped with a seatback frame structure in accordance with a preferred embodiment of the present invention therein.
Figure 2:
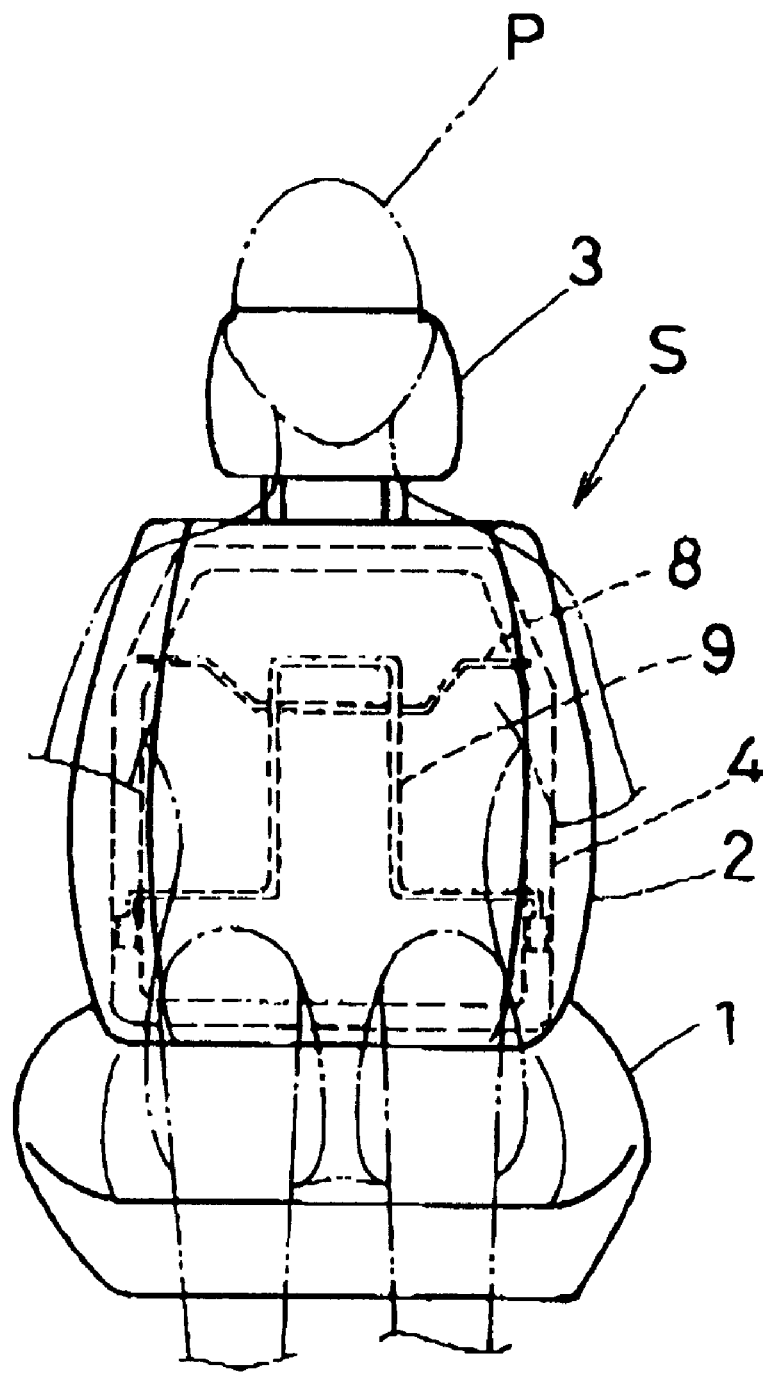
FIG. 2 is a front view of the seatback shown in FIG. 1.
Figure 3:
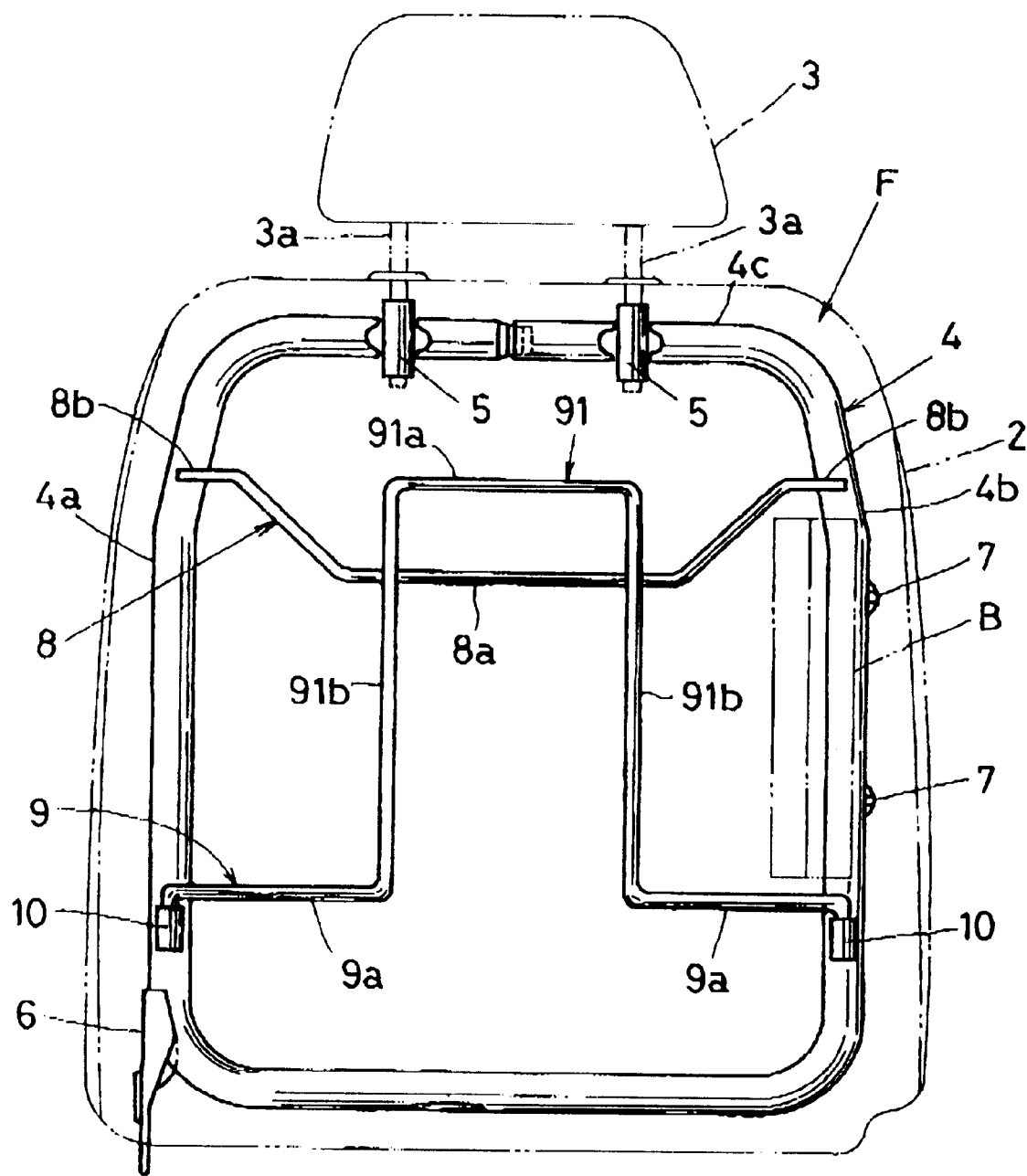
FIG. 3 is a front view showing details of the seatback frame.
Figure 4:
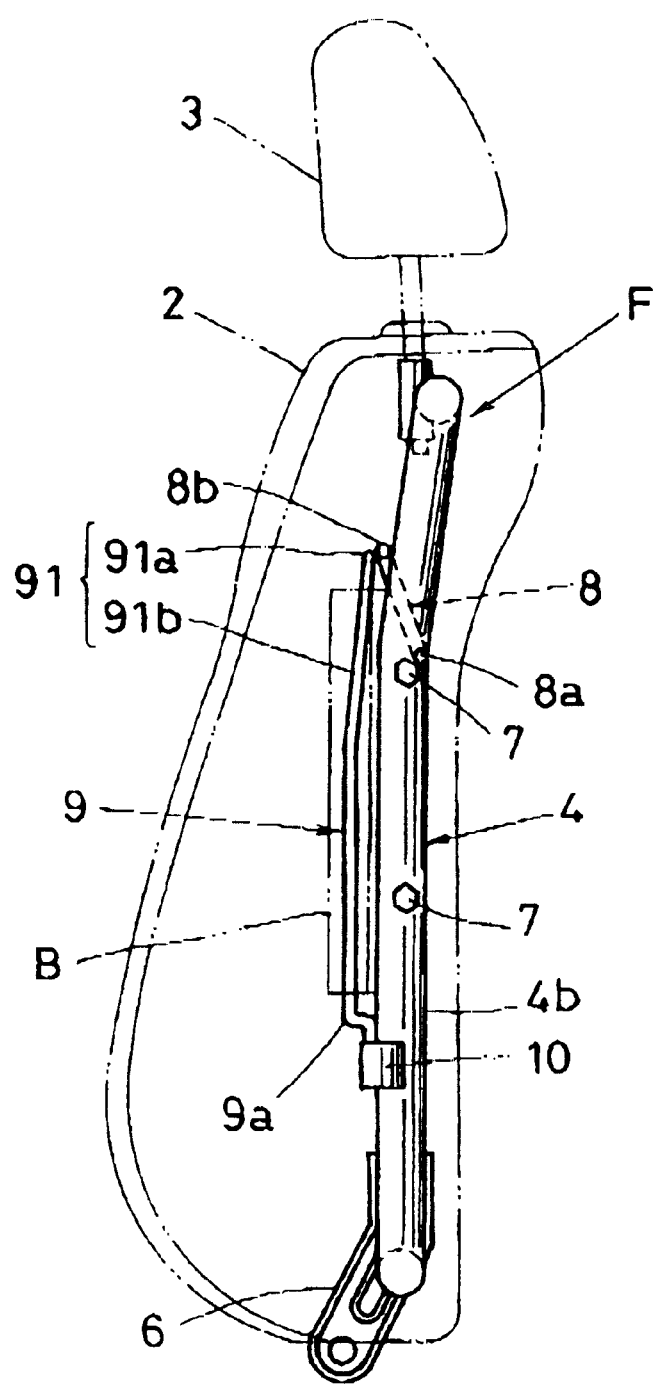
FIG. 4 is a side view showing details of the seatback frame shown in FIG. 3.

Referring to the drawings in detail, in particular to FIGS. 1 to 4 showing a vehicle seat S with a seatback in accordance with a preferred embodiment of the present invention, the vehicle seat S comprises a seat cushion 1, a seatback 2 and a head rest 3. The seatback 2, against which a person P sitting on the vehicle seat S leans on, has a seatback frame 4 made from a pipe installed therein which is configured so as to provide the seatback with a required structural stiffness. The seatback frame 4 has opposite side frame sections 4a and 4b which are slightly deflected at their upper parts backward and toward each other. As shown in FIGS. 3 and 4 in detail, a frame structure F installed in the seatback 2, the seatback frame 4, which is made of a single pipe member, has a configuration forming the side sections 4a and 4b, a lower section 4d and upper sections 4c at which the seatback frame 4 is connected. Each upper section 4c is provided with a mount 5 welded or otherwise secured thereto for receiving a head rest pole 3a extending from the head rest 3. The seatback frame 4 is provided with a bracket 6 welded or otherwise secured to lower end of one of the side sections 4a and 4b, namely a left side section 4a next to a passenger seat (not shown) in this embodiment, for connecting the seatback 2 to the seat cushion 1 so as to allow the seatback 2 to turn relatively to the seat cushion 1. The seatback frame 4 is further provided with an attachment 7 secured to the middle part of another side section, namely the right side section 4b next to a door, for attaching a side air bag unit B. A lower or primary wire frame 9 and an upper or subsidiary wire frame 8 are laid between the side sections 4a and 4b. Specifically, the subsidiary wire frame 8 is welded or otherwise secured to the opposite side sections 4b of the seatback frame 4 at an approximate average height of shoulder blades and deformed downward back from opposite ends 8b so as to form a middle section 8a extending along a specified horizontal length. The primary wire frame 9 comprises three sections, namely opposite horizontal base sections 9a extending from the side vertical sections 4a and 4b, respectively, at an approximate average height of lumbar vertebras, and an inversely U-shaped back support section 91 extending upward in front of and across over the horizontal middle section 8a of the subsidiary wire frame 8. The back support section 91 comprises vertical sections 91b extending from the opposite horizontal base sections 9a, respectively, to the average height of shoulder blades and a horizontal top section 91a extending between the vertical sections 91b. Each of the vertical section 91b at its upper part is slightly deformed backward and shaped so as to extend along the backbone of a person P. Each of the vertical section 91b at its free end is bent downward at a right angle so as to be inserted and fixed in a cylindrical support 10 which is welded or otherwise secured to the side vertical section 4a or 4b of the seatback frame 4. The primary wire frame 9 is configured to have a distance of approximately 50 to 150 mm between the opposite vertical sections 91b. If the distance between the opposite vertical sections 91b is less than approximately 50 mm, the back support sections 91 of the primary wire frame 9 are positioned correspondingly to dendrites at opposite sides of the backbone of a person P sitting on the vehicle seat S which are sensitive to alien substances, so as to cause an enhanced feeling of alien substance at the back of the person P. On the other hand, if the distance between the opposite vertical sections 91b is greater than approximately 150 mm, the primary wire frame 9 provides the person P with a feeling of uncomfortable support at the back.

Figure 5:
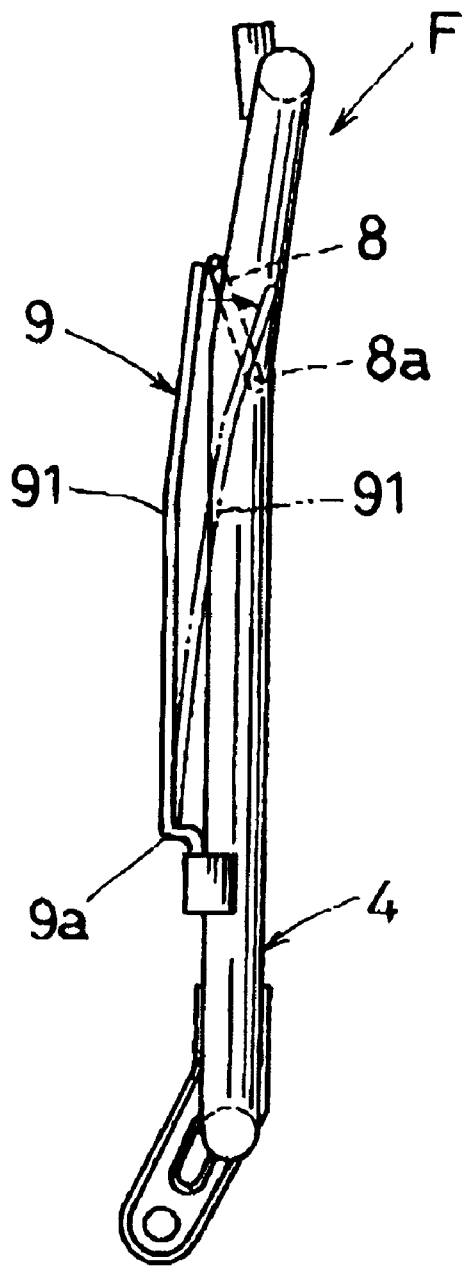
FIG. 5 is an explanatory side view showing deflection of the seatback frame.

According to the seatback frame structure F thus configured, when a person P sits on the vehicle seat S, the seatback frame 4 causes a deformation such as shown in FIG. 5 which provides the person with a comfortable sitting feeling. Specifically, when a person P sits on the vehicle seat S, the back support section 91 of the primary wire frame 9 elastically deforms so as to incline backward about the horizontal base sections 9a as a supporting point until the back support section 91 at its upper part is stopped by the horizontal middle section 8a of the subsidiary wire frame 8 and held in the inclined position as shown by a double-dot broken line in FIG. 5. In other words, the subsidiary wire frame 8 is operative to restrict backward deflection of the primary wire frame 9 and is referred to as a deflection restricting member. By means of the deformation of the back support section 91 in this fashion, the primary wire frame 9 continuously supports over the back of the person P and cooperates with the subsidiary wire frame 8 so as to securely support the shoulder blade of the person P in a wide extent at opposite sides thereof, which improves the continuity of support of the seatback 2, secures supporting rigidity of the seatback 2 against the upper half of the body of the person P, and eliminates a feeling of alien substance at the back of the person P. Furthermore, the primary wire frame 9 which extends from the side vertical sections 4a and 4b of the seatback frame 4 at a height of the of lumbar vertebra of the person P is hard to deform backward even when receiving a load from the person P, so as to securely support the lumbar of the person P.

As described above, the seatback 2 having the seatback frame structure F installed therein elastically deforms backward at a part corresponding in position to the shoulder blade of a person P sitting on the seat 2 with an effect of providing the person P with a feeling of backward movement and securely supports the person P at his or her lumbar without exerting an influence of the deformation of the back support section 91 on the person P along his or her lumbar vertebra, so as to support the back of the person P along the S-shaped backbone. The seatback frame structure F which includes the subsidiary wire frame 8 and the primary wire frame 9 only other than the seatback frame 4 meets a demand for light-weight and adaptability to automatic assembling and provides a large space for installing a side air bag unit. In the case of a reclining seat, the seatback reclined horizontally is prevented from damage even when it is ridden thereon by a person because the inversely U-shaped support section 91 strictly causes only a limited backward deformation.

Figure 6:
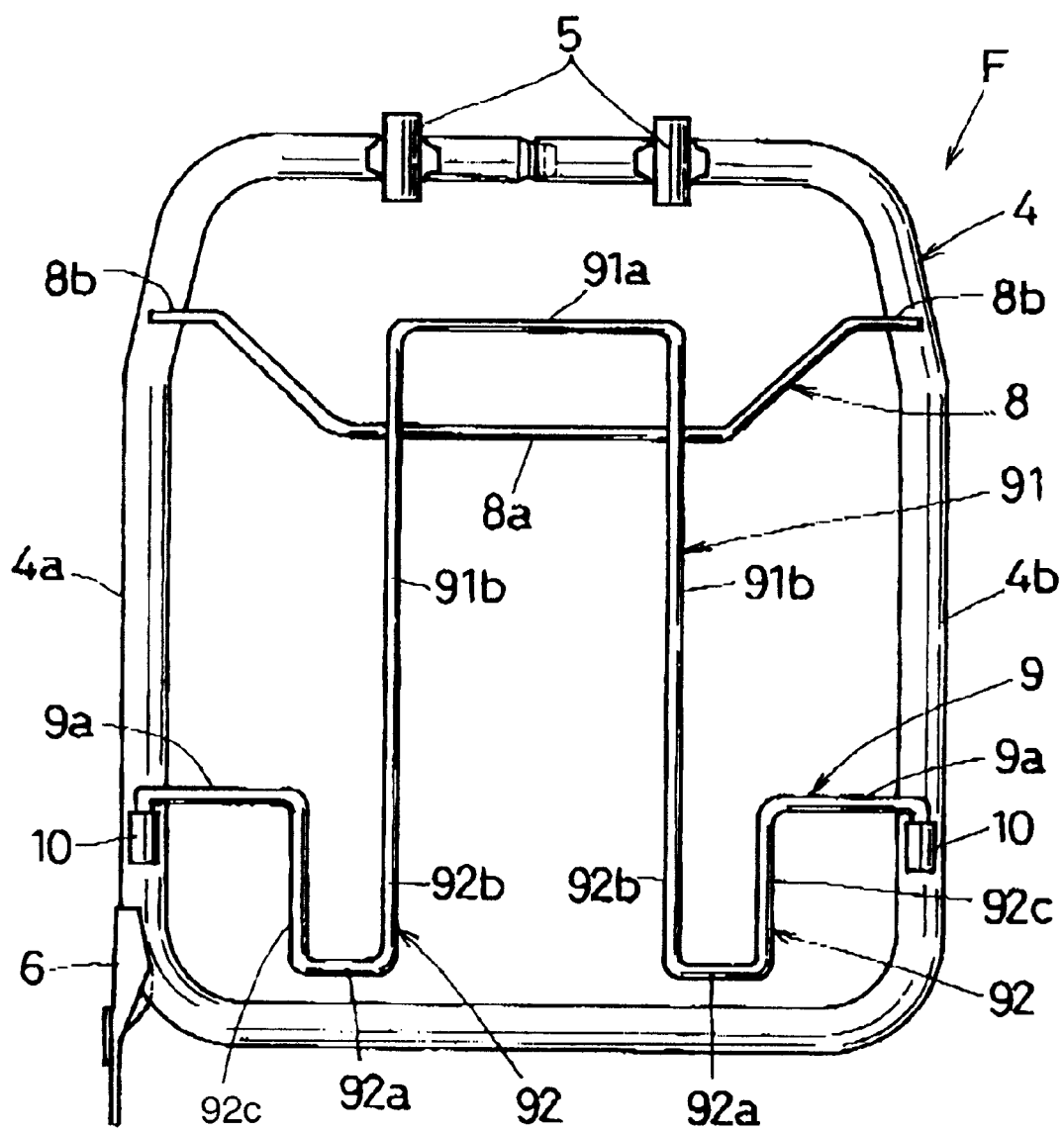
FIG. 6 a front view of a seatback frame structure in accordance with another preferred embodiment of the present invention.
Figure 7:
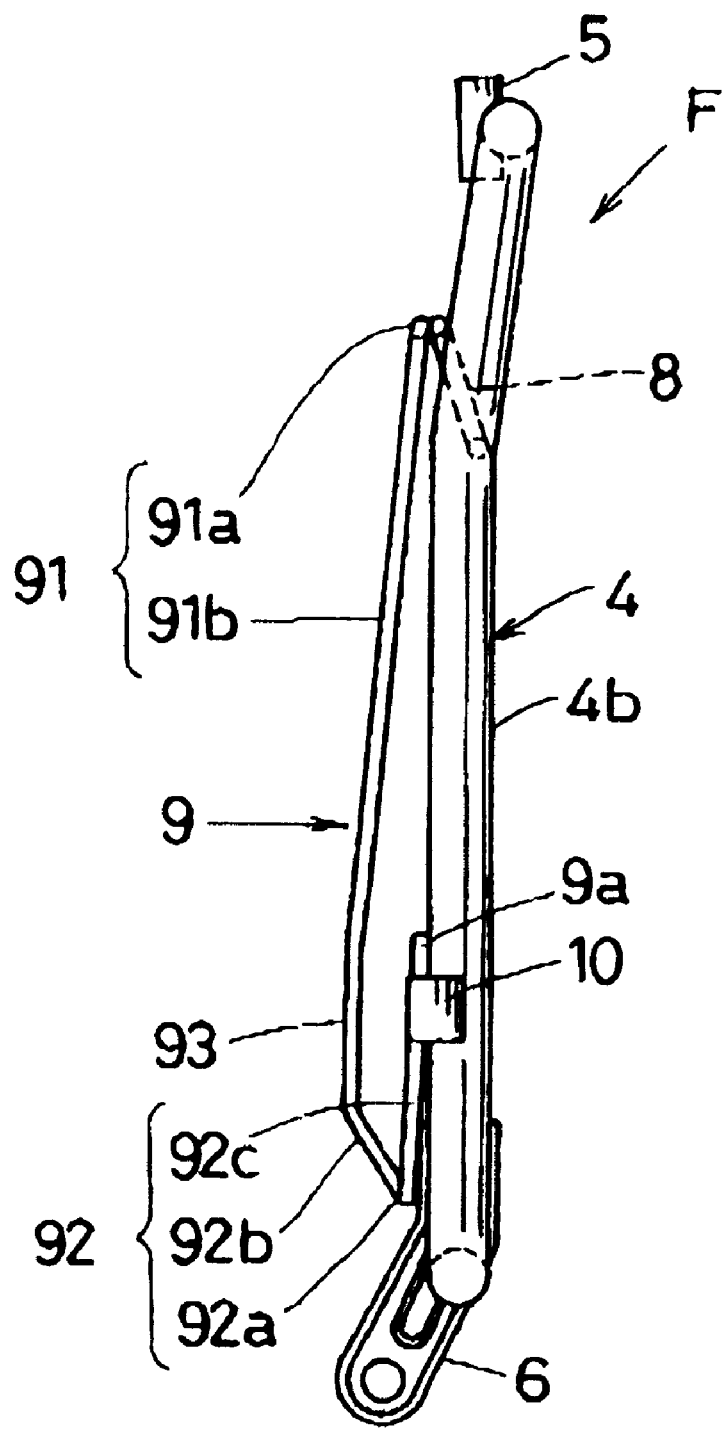
FIG. 7 a side view of the seatback frame structure shown in FIG. 6.

Referring to FIGS. 6 and 7 show a seatback frame structure F in accordance with another embodiment of the present invention which has a primary wire frame 9 different from that shown in FIGS. 3 and 4. As shown, the primary wire frame 9 has a U-shaped lower back support section 92 extending to a position corresponding to a coccyx of a person P sitting on from and between each horizontal base section 9a and an inversely U-shaped upper back support section 91. The lower back support section 92 comprises a vertical section 92c extending from a horizontal base section 9a, a vertical section 92b extending from, or forming part of, the vertical section 91b of the upper back support section 91 and a horizontal section 92a extending the vertical sections 92b and 92c. The vertical section 91b of the upper back support section 91 and the vertical section 92b of the lower back support section 92 form a swelling 30, namely a lumbar support section, directed forward at their juncture which is in a vertical position corresponding to a lumbar vertebra of the person P siting on as shown in FIG. 7.

According to the seatback frame structure F thus configured, in addition to the same effect as the seatback 2 shown in FIGS. 3 and 4, the seatback with the seatback structure F installed therein supports the back of a person P at opposite sides of the backbone from the shoulder blade to part near the coccyx without a break, which eliminates a feeling of alien substrate at the back. Furthermore, the seatback 2 prevents the person P sitting on the vehicle seat S from getting pore sitting posture due to a backward positional change of the buttocks of the person P on the seat cushion 3. The lumbar support section 30 which is formed between and swelled forward from the upper back support section 91 and the lower back support section 92 certainly support the lumbar of the person P sitting on even when the upper back support section 91 and the lower back support section 92 elastically deform backward due to the person's weight. The primary wire frame 9 increasingly vary the seatback stiffness from the lower part to the upper part, so as to provide easily the person P sitting on the seat with appropriate siting posture and realize a low cost seat.

Figure 8:
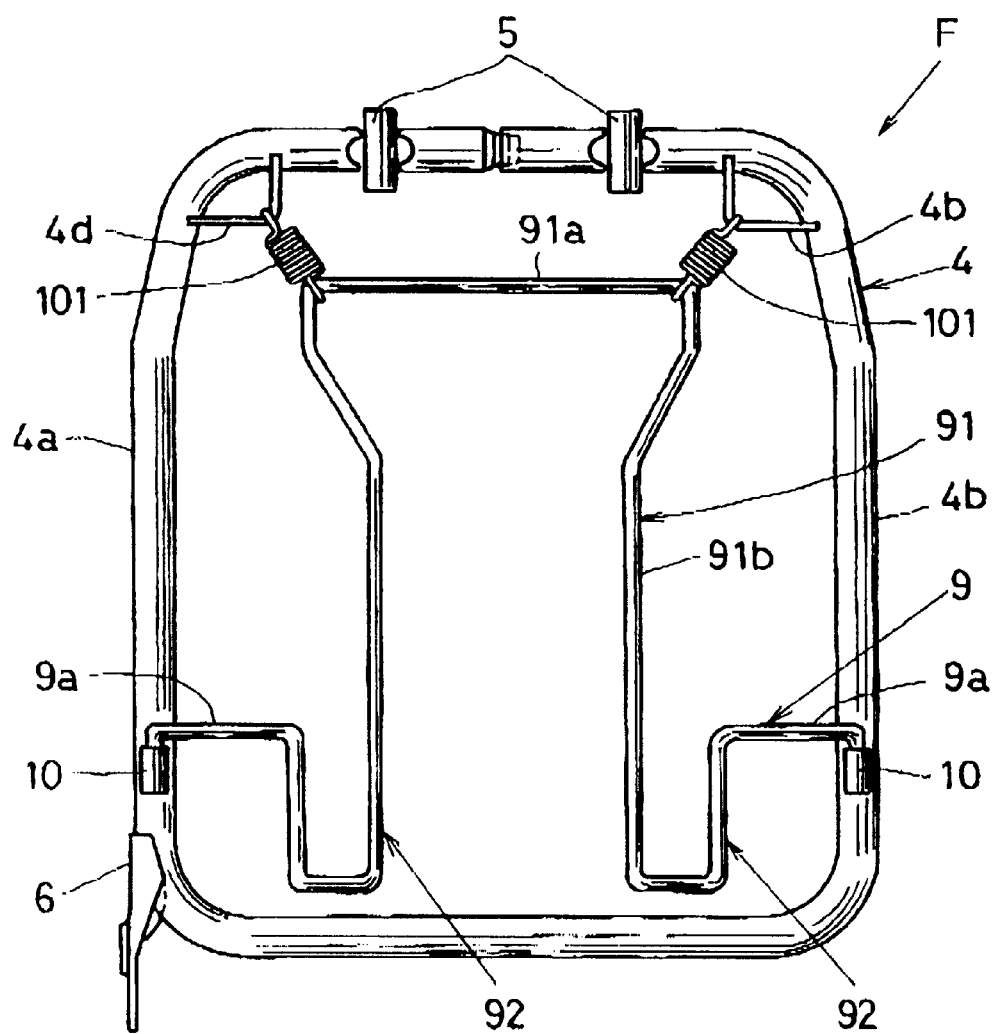
FIG. 8 a front view of a seatback frame structure in accordance with another preferred embodiment of the present invention.
Figure 9:
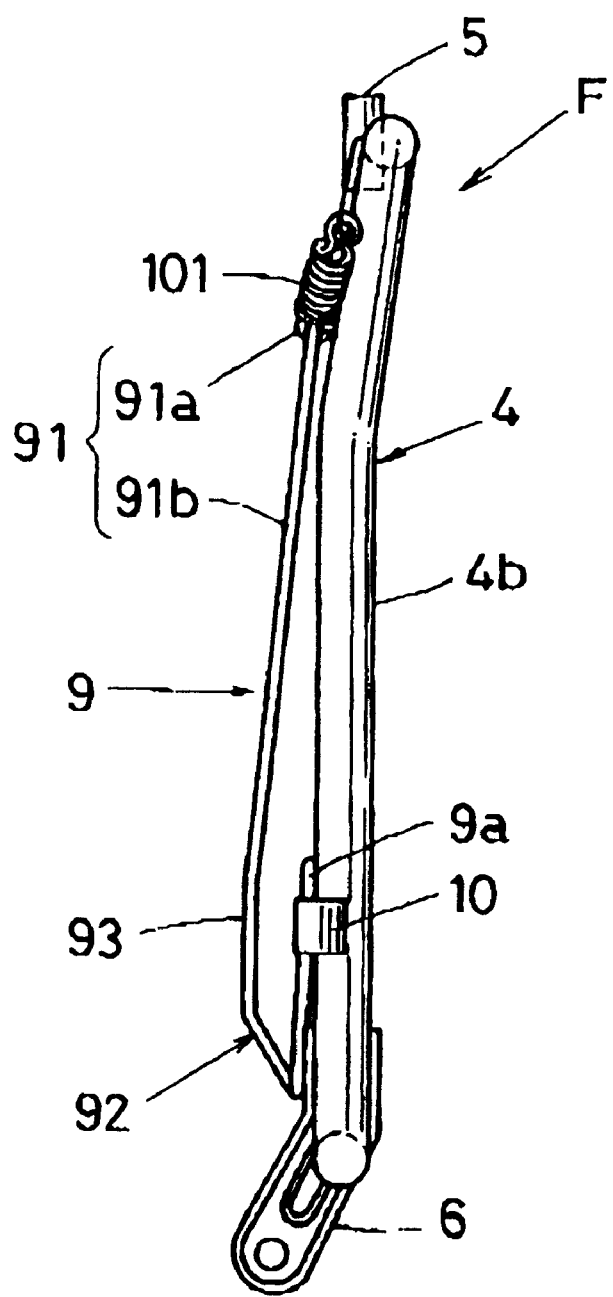
FIG. 9 a side view of the seatback frame structure shown in FIG. 8.

Referring to FIGS. 8 and 9 show another seatback frame structure F which has a pair of tension coil springs 101 in place of the subsidiary wire frame 8 as a deflection restricting member. As shown, the seatback frame structure F has an subsidiary wire frame 9 which comprises an inversely U-shaped upper back support section 91 and U-shaped lower back support sections 92. The upper back support section 91 comprises vertical sections 91b extending from lower back support sections 92, respectively, and a horizontal top section 91a extending between tops of the vertical sections 91b and are configured so to provide a wide space at its upper part so as to securely support the shoulder blade of the person P in a wide extent even though there is no upper wire support provided therein. The tension springs 101 are mounted between upper corners of the upper back support section 91 and corner brackets 4d secured to upper corners of the upper back support section 91.

According to the seatback frame structure F thus configured, although the seatback 2 needs a little increased number of parts, it provides almost the same results as those described above. Furthermore, the tension spring 101 for suspending the upper back support section 91 from the seatback frame 4 is replaced with another tension spring having a different spring tension so as to change backward deflection of the upper back support section 91, which is always desirable to provide the seatback 2 meeting a demand of a person P who sits on the vehicle seat S.

Figure 10:
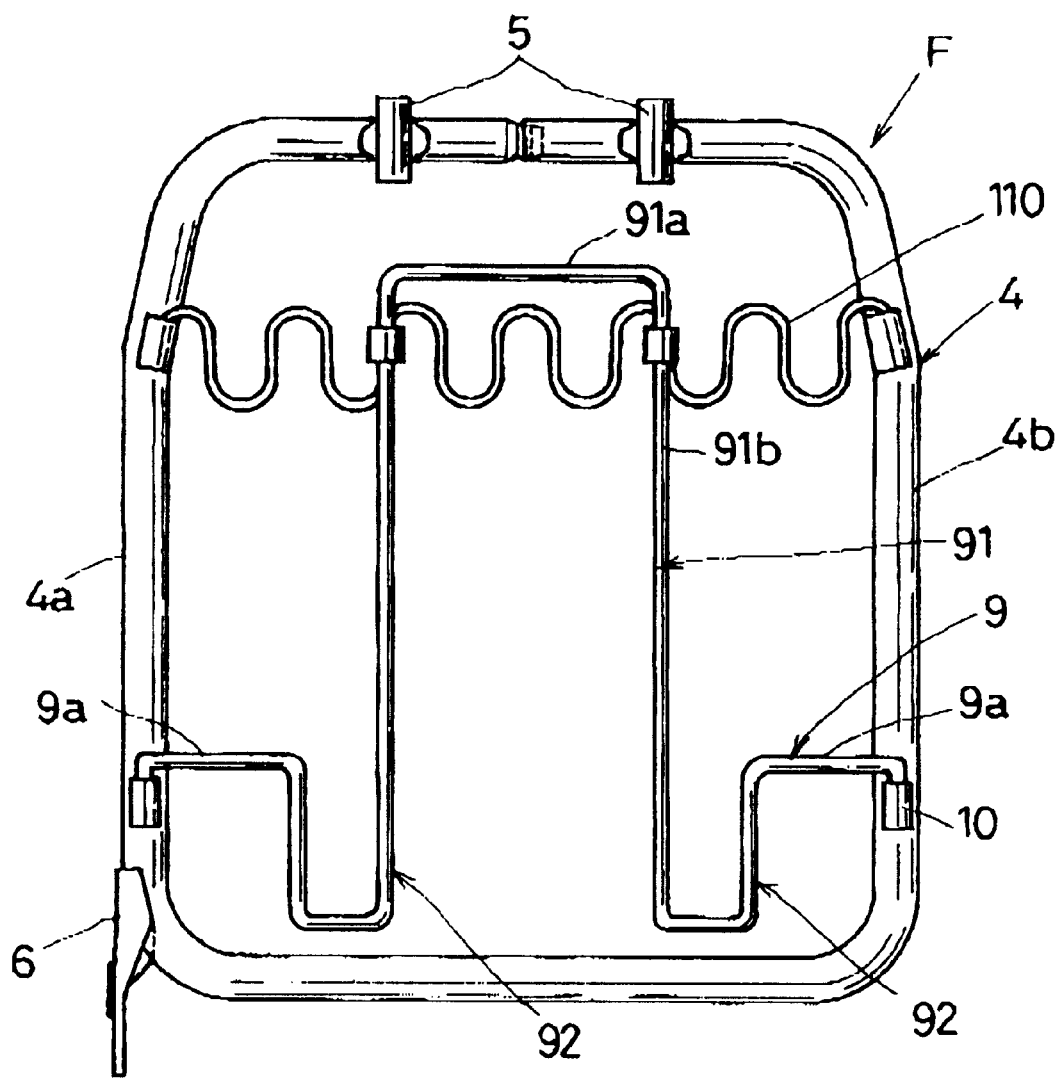
FIG. 10 a front view of a seatback frame structure in accordance with another preferred embodiment of the present invention.
Figure 11:
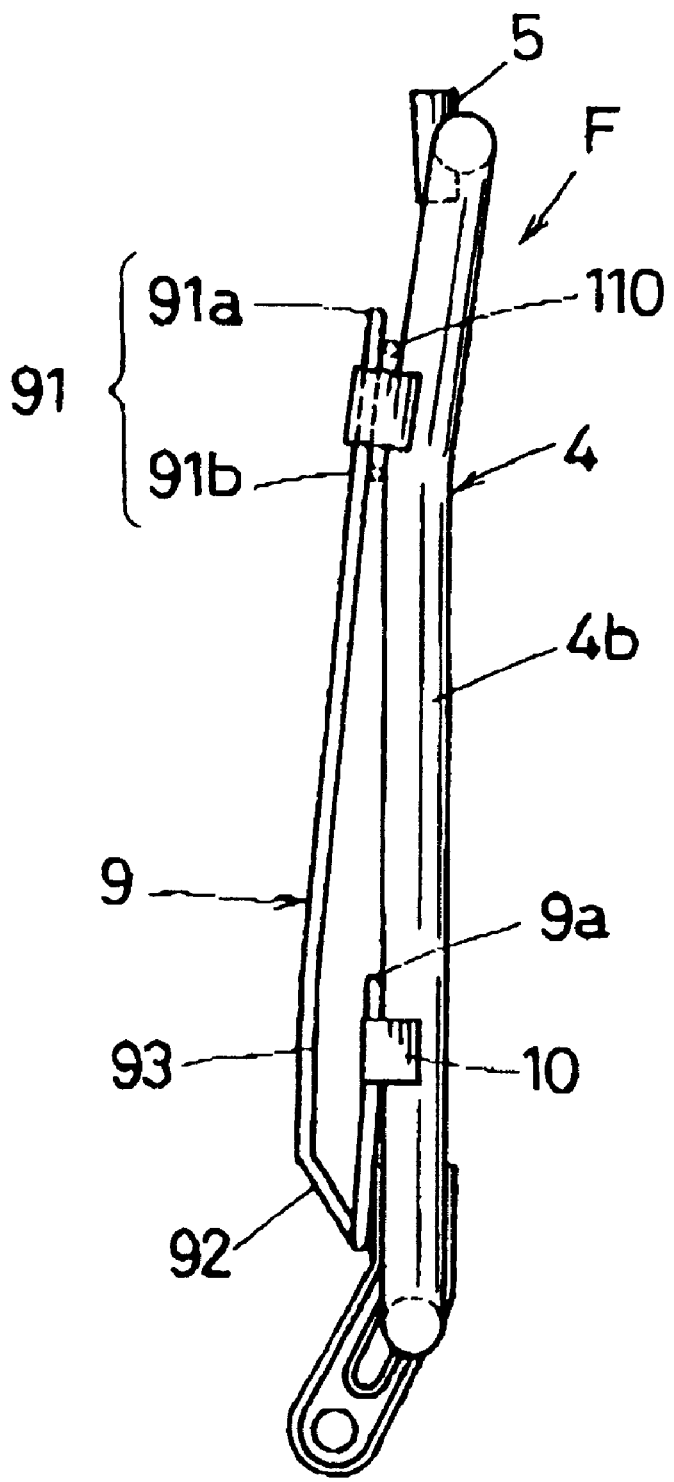
FIG. 11 a side view of the seatback frame structure shown in FIG. 10.

Referring to FIGS. 10 and 11 show a seatback frame structure F in accordance with another embodiment of the present invention which has a wave-formed wire spring 110 as a deflection restricting member in place of the subsidiary wire frame 8. As shown, the wave-formed wire spring 110 is secured at opposite ends to opposite side frame sections 4a and 4b of a seatback frame 4, respectively. An upper back support section 91 at vertical sections 91b is secured to the wave-formed wire spring 110. The upper support section 91, which has just the same configuration as that of the seatback frame F shown in FIG. 6 and 7, cooperates with the wave-formed wire spring 110 to support the upper back of a person P sitting on the vehicle seat S.

According to the seatback frame structure F thus configured, the seatback 2 provides the same results as those previously described, besides the seatback 2 meeting a demand of a person P who sits on the vehicle seat S can be provided by replacing the wave-formed wire spring 110 with one having a different spring strength so as to change backward deflection of the upper back support section 91. The wave-formed wire spring 110 does not need a space thick as much as the coil tension springs 101 shown in FIGS. 8 and 9, so that the seatback 2 can be thin.

Figure 12:
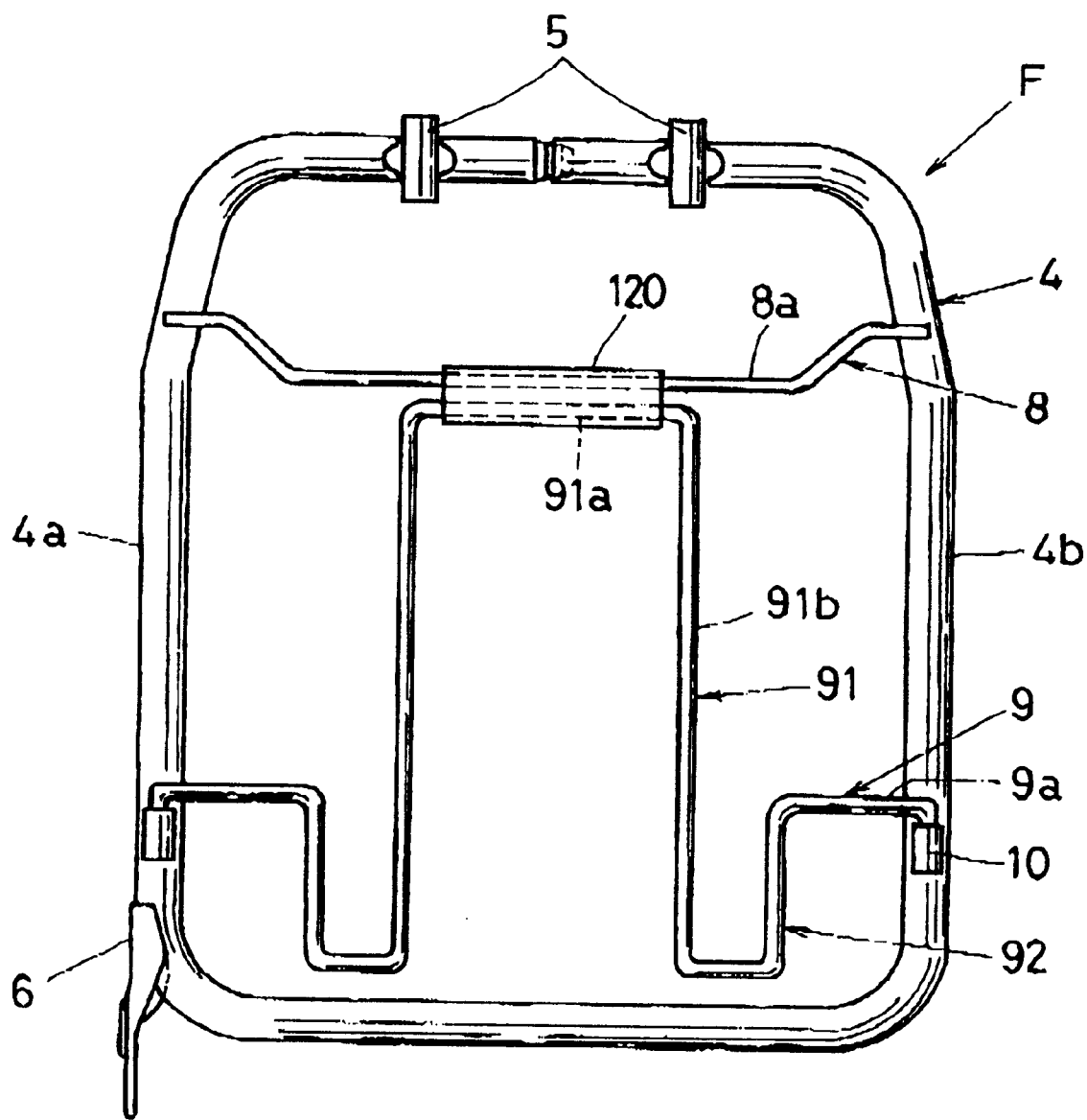
FIG. 12 a front view of a seatback frame structure in accordance with still another preferred embodiment of the present invention.
Figure 13:
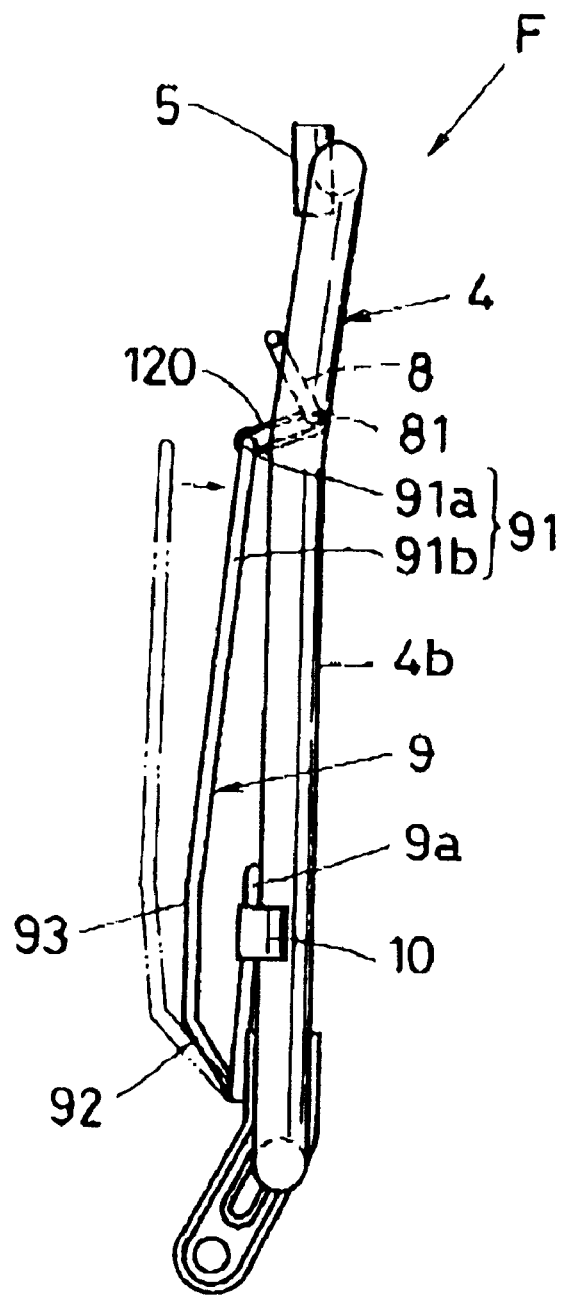
FIG. 13 a side view of the seatback frame structure shown in FIG. 12.

Referring to FIGS. 12 and 13 show a seatback frame structure F in accordance with still another embodiment of the present invention in which a primary wire frame 9 is connected to an subsidiary wire frame 8 so as to provide the primary wire frame 9 with a froward tension in a state where no person sits on a vehicle seat S with an effect of increasing stiffness of the primary wire frame 9 against backward deflection and decreasing backward deflection of the primary wire frame 9. Specifically, the primary wire frame 9 at its horizontal top section 91a is coupled to a middle section 8a of the subsidiary wire frame 8 by means of an elasticity exerting member, for example a coupler 120 such as made of an unwoven fabric that is hard to expand and causes less frictional sounds. The primary wire frame 9 is installed to a seatback frame 4 with a slight forward deflection as shown by a double-dotted broken line in FIG. 13 before it is coupled to the subsidiary wire frame 8. When coupling the primary wire frame 9 to the subsidiary wire frame 8, the primary wire frame 9 is pulled back and then coupled to the subsidiary wire frame 8 by the unwoven fabric coupler 120, so as to be provided with forward elasticity. As a result, the primary wire frame 9 is provided with increased stiffness against backward deflection during supporting the back of the person P.

According to the seatback frame structure F thus configured, the seatback 2 provides the same results as those shown in FIGS. 3 to 5 and FIGS. 6 and 7. Furthermore, because the primary wire frame 9 is pre-tensioned forward, the upper part of the seatback 2 is provided with ensured stiffness against a load applied thereto without providing the primary wire frame 9 with increased stiffness. Utilizing the unwoven fabric coupler 120 in place of the tension springs 101 or the wave-formed wire spring 110 prevents the upper back support section 91 from abutting against the subsidiary wire frame 8 and causing noises due to friction with the subsidiary wire frame 8.

Figure 14:
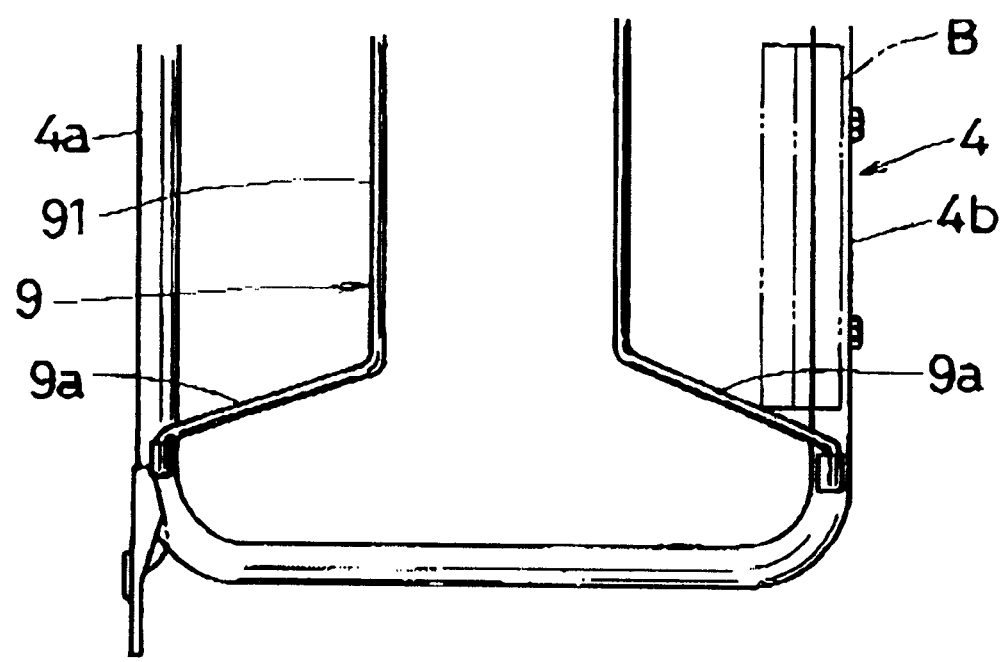
FIG. 14 a front view of a lower part of a seatback frame structure in which base frame sections are bent outward down.
Figure 15:
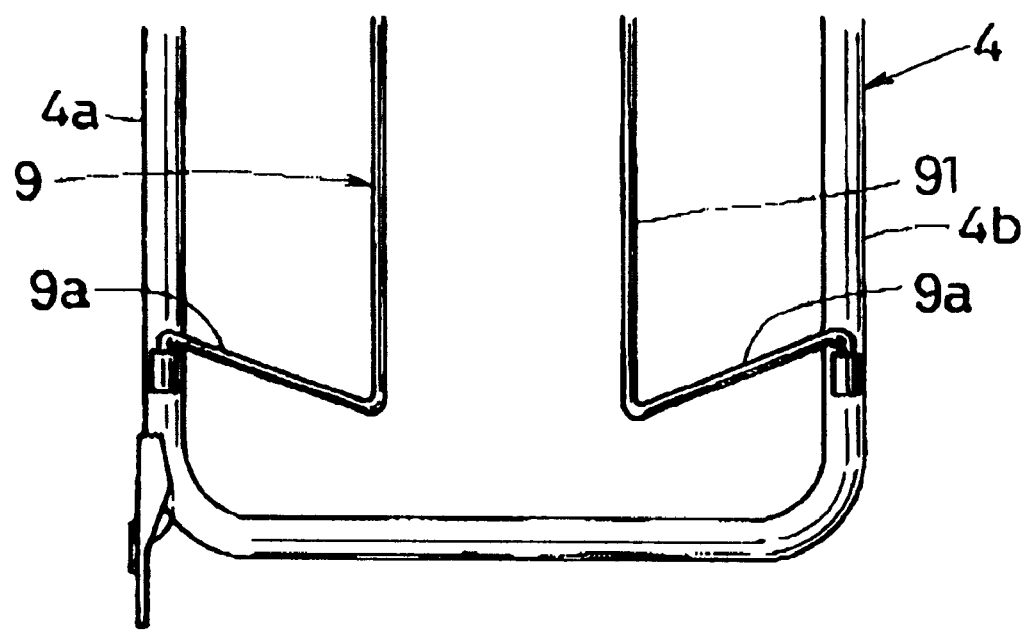
FIG. 15 a front view of a lower part of a seatback frame structure in which base frame sections are bent outward up.

The primary wire frame 9 may be configured in fitting structure as shown in FIG. 14 or 15.

As shown in FIG. 14, a primary wire frame 9 has a back support section 91 which comprises opposite vertical sections 91 extending from opposite base sections 9a, respectively. Each base section 9a extends outward down from the vertical section 91 so as to provide a broad space on an side of each side frame section 4a, which is desirable for increasing the degree of freedom of laying out a side air bag unit B.

As shown in FIG. 15, a primary wire frame 9 has a back support section 91 extending near a position corresponding to a coccyx of a person P sitting on the seat S which comprises opposite vertical sections 91 extending from opposite base sections 9a extending outward up, respectively. A seatback 2 having the primary wire frame 9 thus configured provides support of the back of a person sitting on the seat from the near coccyx position to the shoulder blade even though it is not provided with a lower back support section like those shown in FIG. 6, 8, 10 or 12. While a person P leans on the seatback 2, the primary wire frame 9 deforms continuously from its lower part to its upper part, so that the seatback 2 at its middle section can support the back of the person P continuously to the near coccyx position. Furthermore, the seatback 2 at its opposite sides increases supporting rigidity against the lumbar of the person by means of the inclined base sections 9a.

The seatback frame is not limited to those of the preferred embodiments and may be modified and constructed by a single wire frame as long as comprising an lower back support section and base sections that work as a lumbar support. Further, the seatback may be utilized for seats other than a vehicle seat.

It is to be understood that although the present invention has been described in detail with regard to preferred embodiments thereof, various other embodiments and variants may occur to those skilled in the art, which are within the scope and spirit of the invention, and such other embodiments and variants are intended to be covered by the following claims.

What is claimed is:

1. A seatback frame structure which is installed in a seatback of a seat, said seatback frame structure comprising:
   a generally rectangular seatback frame having opposite side frame sections extending vertically along opposite sides of said seatback; and
   an integral wire frame comprising an inversely U-shaped support frame section extending upward and a base frame section laterally extending from each of lower ends of said inversely U-shaped support frame section and secured to one of said opposite side frame sections of said seatback frame, said wire frame being elastically deflectable backward with respect to each said base frame section.

2. A seatback frame structure as defined in claim 1, wherein said wire frame further comprises downward extending support frame sections disposed between said base frame sections and said upward extending support frame section, respectively, and extending downward from said base frame sections and elastically deflectable backward with respect to said base frame sections.

3. A seatback frame structure as defined in claim 1, and further comprising a deflection restricting member operative to restrict said wire frame to a specified backward deflection.

4. A seatback frame structure as defined in claim 3, wherein said deflection restricting member is disposed behind said upward extending support frame section of said wire frame and comprises a subsidiary wire frame extending between and secured to upper parts of said opposite side frame sections, respectively, so as to cross over said upward extending support frame section of said wire frame.

5. A seatback frame structure as defined in claim 3, wherein said deflection restricting member comprises an elastic member operative to suspend said upward extending support frame section from said generally rectangular seatback frame.

6. A seatback frame structure as defined in claim 1, wherein each said base frame section extends horizontally.

7. A seatback frame structure as defined in claim 1, and further comprising an elasticity exerting member operative to provide said wire frame with forward elasticity and to allow said upward extending support frame section to deflect only backward.

8. A seatback frame structure as defined in claim 7, wherein said elasticity exerting member fixedly couples said wire frame at said upward extending support frame section to said generally rectangular seatback frame.

9. A seatback frame structure as defined in claim 2, wherein said wire frame is configured so as to have a forward bend between said upward extending support frame section and said downward extending support section.

10. A seatback frame structure which is installed in a seatback of a seat, said seatback frame structure comprising:
   a generally rectangular seatback frame having opposite side frame sections extending vertically along opposite sides of said seatback; and
   an integral wire frame comprising an inversely U-shaped support frame section extending upward and a base frame section laterally extending from each of lower ends of said inversely U-shaped support frame section and secured to one of said opposite side frame sections of said seatback frame, said inversely U-shaped support frame section being mechanically separated from said seatback frame and configured so as to be elastically deflectable backward greater at an upper portion of said wire frame than at a lower portion of said wire frame.

11. A seatback frame structure as defined in claim 10, wherein said wire frame further comprises downward extending support frame sections disposed between said base frame sections and said upward extending support frame section, respectively, and extending downward from said base frame section and elastically deflectable backward with respect to said base frame sections.

12. A seatback frame structure as defined in claim 10, and farther comprising a deflection restricting member operative to restrict said wire frame to a specified backward deflection.

13. A seatback frame structure as defined in claim 12, wherein said deflection restricting member is disposed behind said upward extending support frame section of said wire frame and comprises a subsidiary wire frame extending between and secured to upper parts of said opposite side frame sections, respectively, so as to cross over said upward extending support frame section of said wire frame.

14. A seatback frame structure as defined in claim 10, wherein said base frame section extends horizontally.

15. A seatback frame structure which is installed in a seatback of a seat, said seatback frame structure comprising:
   a generally rectangular seatback frame having opposite side frame sections extending vertically along opposite sides of said seatback;
   an integral wire frame comprising a n inversely U-shaped support frame section extending upward and a base frame section laterally extending from each of lower ends of said inversely U-shaped support frame section and secured to one of said opposite side frame sections of said seatback frame; and
   a support member by which an upper section of said inversely U-shaped support frame section is supported by said seatback frame and which allows said wire frame to elastically deflect backward more greatly at an upper portion thereof than at a lower portion thereof.

16. A seatback frame structure as defined in claim 15, wherein said wire frame further comprises downward extending support frame sections disposed between said base frame sections and said upward extending support frame section, respectively, and extending downward from said base frame sections and elastically deflectable backward with respect to said base frame sections.

17. A seatback frame structure as defined in claim 15, and further comprising a deflection restricting member operative to restrict said wire frame to a specified backward deflection.

18. A seatback frame structure as defined in claim 17, wherein said deflection restricting member comprises an elastic member operative to suspend said upward extending support frame section from said generally rectangular seatback frame and said support member comprises an elastic member.

19. A seatback frame structure as defined in claim 15, wherein said base frame section extends horizontally.

20. A seatback frame structure as defined in claim 15, and further comprising an elasticity exerting member operative to provide said wire frame with forward elasticity and to allow said upward extending support frame section to deflect only backward.

* * * * *